United States Patent
Bajahr

(10) Patent No.: US 7,719,406 B2
(45) Date of Patent: May 18, 2010

(54) DEVICE FOR TRANSMITTING SIGNALS VIA INDUCTION BETWEEN A TRANSPONDER CIRCUIT AND AN INTERROGATION CIRCUIT

(75) Inventor: Frank Bajahr, Bergisch Gladbach (DE)

(73) Assignee: Smartrac Technology Germany GmbH, Reichshof-Wehnrath (DE)

( * ) Notice: Subject to any disclaimer, the term of this patent is extended or adjusted under 35 U.S.C. 154(b) by 1079 days.

(21) Appl. No.: 10/547,413

(22) PCT Filed: Mar. 2, 2004

(86) PCT No.: PCT/EP2004/002057

§ 371 (c)(1),
(2), (4) Date: Aug. 31, 2005

(87) PCT Pub. No.: WO2004/078495

PCT Pub. Date: Sep. 16, 2004

(65) Prior Publication Data

US 2006/0164214 A1   Jul. 27, 2006

(30) Foreign Application Priority Data

Mar. 3, 2003   (EP) ................... 03004618

(51) Int. Cl.
*G06F 19/00* (2006.01)
(52) U.S. Cl. ........... 340/10.41; 340/10.1; 340/572.7; 340/572.2; 340/444; 340/442; 340/426.33; 340/445; 340/447; 340/448
(58) Field of Classification Search ......... 340/10.41, 340/10.1, 10.4, 572.7, 572.1, 442, 572.6, 340/426.33, 445, 447, 448, 572; 73/146.2, 73/146.4, 763, 774, 779
See application file for complete search history.

(56) References Cited

U.S. PATENT DOCUMENTS

| | | | | |
|---|---|---|---|---|
| 4,075,632 | A | * | 2/1978 | Baldwin et al. ......... 342/51 |
| 5,235,850 | A | * | 8/1993 | Schurmann ........... 73/146.5 |
| 5,939,977 | A | | 8/1999 | Monson |
| 6,118,367 | A | * | 9/2000 | Ishii ..................... 340/10.1 |

FOREIGN PATENT DOCUMENTS

| | | | |
|---|---|---|---|
| DE | 199 24 830 A1 | | 11/2000 |
| EP | 0657836 | * | 4/1997 |
| EP | 1223056 | * | 7/2002 |

* cited by examiner

*Primary Examiner*—Vernal U Brown
(74) *Attorney, Agent, or Firm*—Sughrue Mion, PLLC

(57) ABSTRACT

An inductive signal transmission device including a transponder circuit (1) having at least one first coil, and an interrogation circuit (3) having at least one second coil (4). The transponder circuit is placed on an object (5) capable of rotating about at least one rotational axis (9) passing through the object. The interrogation circuit is placed on a structure, which can be stationary, to which the object is connected. A coupling coil (2), provided with at least one turn describing a ring, is mounted on the structure or the object coaxially to the rotational axis of the object. This coupling coil acts as the inductive coupling interface between the first coil and the second coil such that the inductive signal transmission is independent of the rotation of the object. The transponder circuit is of the passive type and includes at least one sensor for measuring a physical parameter. The device can be used in the automobile industry by placing the transponder circuit (1) and the coupling coil (2) on the wheel of a vehicle (5) and the interrogation circuit (3) on the chassis or body of the vehicle.

9 Claims, 3 Drawing Sheets

DEVICE FOR TRANSMITTING SIGNALS VIA INDUCTION BETWEEN A TRANSPONDER CIRCUIT AND AN INTERROGATION CIRCUIT

BACKGROUND OF THE INVENTION.

The invention concerns a device for transmitting signals via induction between a transponder circuit and an interrogation circuit. For transmission of the inductive signals, the transponder circuit comprises a first coil, and the interrogation circuit comprises a second coil. The transponder circuit is placed on an object capable of rotating about at least one axis of rotation passing through the object, whereas the interrogation circuit is placed on a structure, which can be stationary, to which the object is connected.

In an automobile application, the rotating object can be for example a vehicle wheel, whereas the structure is for example the vehicle body or chassis. In such case, one could envisage the transponder circuit including at least one sensor for measuring a physical parameter. It may be a pressure sensor for measuring the vehicle tyre pressure, a temperature sensor, a force sensor, an accelerometer or any other type of sensor. The measurements made by the transponder circuit sensor or sensors can be transmitted to the interrogation circuit in the inductive signals for example by amplitude modulation.

Since the transponder circuit is placed on the rotating object, the distance separating it from the interrogation circuit is not constant during rotation of the object. Consequently, a stray amplitude modulation occurs during transmission of the inductive signal between the interrogation circuit and the transponder circuit, which can be a significant drawback. Thus, during demodulation operations in the receiver unit, it can happen that the data received in the inductive signals does not entirely correspond to the transmitted data. This interference to the transmitted data can also be dependent upon the rotational speed of the object. The higher the rotational speed, the more this interference can be significant.

By way of illustration, FIG. 1 shows in a simplified manner the influence that the rotation of an object can have on the amplitude of the inductive signals sensed by the receiver unit. Inductive signals are first of all transmitted by the transmitter unit at a determined carrier frequency and determined amplitude. The modulated data in the inductive signals are thus not shown in this Figure for the sake of simplification. Since the distance separating the receiver unit from the transmitter unit varies when the object rotates, the amplitude of the sensed inductive signals, i.e. the amplitude of the induced voltage in the receiver unit coil, changes.

In FIG. 1, this amplitude variation is illustrated by the envelope of inductive signals sensed by the receiver unit. This envelope is represented simply in sinusoidal form corresponding to a constant rotational speed of the object. However, it is clear that the shape of this envelope is not actually sinusoidal, since the amplitude of the magnetic field created by the transmitter coil does not decrease linearly with the distance separating the transmitter coil from the receiver coil.

In certain signal transmission devices, it has also been proposed to transmit high frequency signals between the transponder circuit and the interrogation circuit. The high frequency signals used avoid excessive dependence upon the rotation of the object on which the transponder circuit is mounted. However, by using a device of this type which produces high frequency signals (for example 2.45 GHz) in an automobile application, it has been demonstrated that the water can have a negative influence on the performance of the device. Moreover, since the transponder circuit transmits high frequency signals, it must be provided with its own source of energy, such as a battery. This may also be a drawback, since in this case the transponder circuit consumes energy even if the interrogation circuit is not interrogating it.

SUMMMARY OF THE INVENTION

Thus, it is an object of the present invention to provide an inductive signal transmission device which includes means for removing an undesirable inductive signal amplitude modulation disturbance when the object rotates with respect to the structure in order to overcome the drawbacks of the aforementioned prior art.

It is another object of the present invention is to provide an inductive signal transmission device, which is simple to make while reducing manufacturing costs and which does not consume much electrical energy.

The invention therefore concerns an aforementioned inductive signal transmission device which is characterized in that a coupling coil, provided with at least one closed loop turn, is mounted on the structure or on the object coaxially to the axis of rotation of the object, said coupling coil acting as an inductive coupling interface between the first coil and the second coil.

One advantage of the inductive transmission device according to the invention is that it is not necessary to know whether the object is rotating about its rotational axis or it is idle, since transmission of said signals is substantially independent of the rotation of the object. The coupling coil acts as an interface between the interrogation circuit and the transponder circuit independently of the distance separating the first coil of the transponder circuit from the second coil of the interrogation circuit. Of course, in order not to be influenced by the rotation of the object, the coupling coil that has at least one annular turn must be mounted on the structure or on the object coaxially to the rotational axis of the object. Thus, owing to this coupling coil, the first coil and the second coil can be considered equidistant even when the object rotates.

In an advantageous embodiment of the device, the transponder circuit comprises a passive transponder. In this way, the transponder circuit is only powered by the inductive signals induced by the interrogation circuit. When the interrogation circuit is not producing any inductive signals, the transponder circuit thus remains idle without electric power. Moreover, the inductive signal transmission device is independent of manufacturing tolerances particularly as regards the resonance frequency of the resonant units of each circuit.

Since the coils are close to each other, the inductive signals are at a low frequency, for example of the order of 125 kHz. Preferably, the transponder circuit comprises a resonant unit formed in particular by the inductance of the first coil and a capacitor mounted in parallel. The inductance and capacitor values are selected so as to define a resonant frequency close to the frequency of the signals transmitted by the interrogation circuit. This allows maximum amplitude for the sensed inductive signals, and facilitates the storage of energy for powering the components of the transponder circuit.

The coupling coil is advantageously of larger dimensions than the first coil of the transponder circuit and the second coil of the interrogation circuit. This coupling coil can comprise only one annular turn in the form of a closed loop. The planes or axes of the turns of each coil are arranged parallel to each other. Moreover, the first coil, seen in the axial direction, is in the closed loop of the coupling coil.

Advantageously, the inductive signal transmission device is used for a vehicle.

The transponder circuit and the coupling coil are preferably placed on one of the vehicle wheels, and the interrogation circuit is placed on a fixed structure which is for example the chassis or body of the vehicle. The transponder circuit can also comprise at least one sensor for measuring a physical parameter. It may be, for example, a pressure sensor for measuring the pressure of a vehicle tyre, a temperature sensor or a sensor for measuring tyre deformation. The measurements carried out by the sensor or sensors can be stored in the transponder circuit when it is being powered, or transferred by the inductive signals to the interrogation circuit. The data is preferably transmitted in the inductive signals by amplitude modulation.

BRIEF DESCRIPTION OF THE DRAWINGS

The objects, advantages and features of the inductive signal transmission device will appear more clearly in the following description of at least one embodiment illustrated by the drawings, in which.

DETAILED DESCRIPTION OF THE PREFERRED EMBODIMENT

A preferred embodiment of the inductive signal transmission device in the automobile industry will now be described. It should be noted in the following description that the electronic components of the inductive signal transmission device, which are well known to those skilled in this technical field, will not be described in detail.

Figure 1:
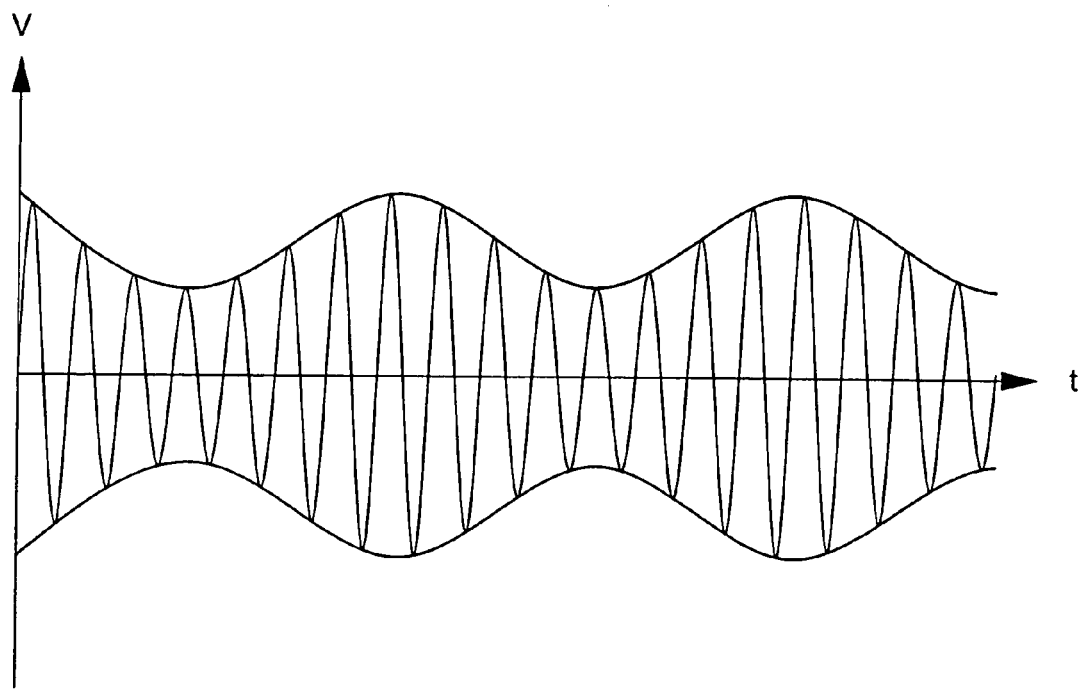
FIG. 1 that has already been cited shows in a simplified manner the influence of the rotation of an object, such as a vehicle wheel, on the amplitude of the inductive signals sensed by the coil of a receiver unit of a conventional signal transmission device.
Figure 2:
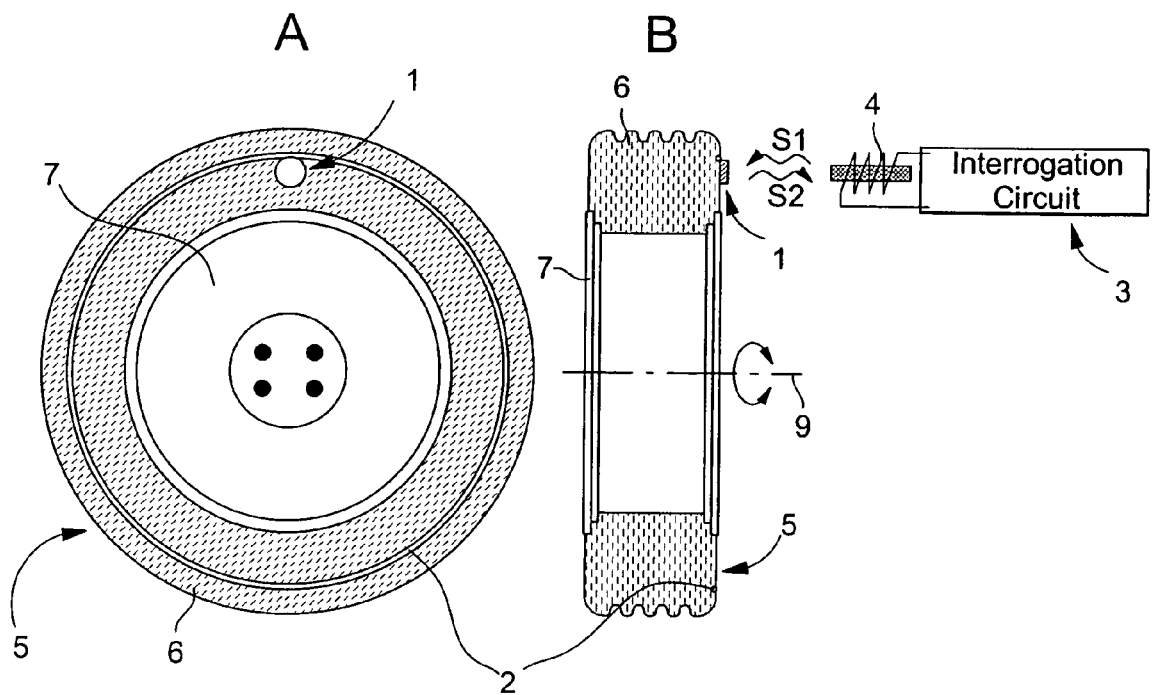
FIG. 2 shows schematically a front view A and a side view B partially in cross-section of an embodiment of the inductive signal transmission device according to the invention, mounted on a vehicle wheel and chassis.

In FIG. 2, the inductive signal transmission device comprises a transponder circuit 1, preferably mounted on tyre 6 of a vehicle wheel 5, a magnetic coupling coil 2 of annular shape also mounted on tyre 6, and an interrogation circuit 3 mounted on a fixed structure of the vehicle, not shown, such as the chassis or the body.

Coupling coil 2 comprises one or several turns forming at least one closed loop. This coupling coil can be integrated in the structure of vehicle tyre 6 during manufacture for example, or fixed on the external or internal side of the tyre. Preferably, the shape of the coupling coil is circular. The coupling coil is positioned on tyre 6 coaxially to a rotational axis 9 which passes through the centre of the wheel rim 7 of vehicle. Thus, a rotation of the wheel about its rotational axis does not alter the position of the coupling coil, particularly with respect to the interrogation circuit.

Of course, coupling coil 2 can also be mounted on the fixed structure coaxially to rotational axis 9 of the wheel. However, this construction is more complicated and can cause certain magnetic coupling problems, since the vehicle body or chassis is generally metallic.

Transponder circuit 1 comprises a first coil that is not shown in this Figure. The first coil can be made for example on a flexible or rigid printed circuit board which carries the integrated transponder circuit. This first coil can comprise turns arranged in the same plane in the form of a spiral or wound in helix form about a magnetic core. Preferably the plane or axis of the turns of the first coil is substantially parallel to the plane or axis of coupling coil 2 for improved magnetic coupling between the two coils. The first coil, seen in the axial direction of the coupling coil is for example inside the closed turn or turns of the coupling coil.

Transponder circuit 1 can be fixed onto an external side of tyre 6 as shown in FIG. 2, on an inner side of the tyre or onto wheel rim 7. As for the coupling coil, one could envisage integrating the transponder circuit in the mass of tyre 6 when it is manufactured. However, incorporation of the transponder circuit in the tyre mass can cause certain manufacturing problems and means that said circuit cannot be changed in the event of a breakdown.

Interrogation circuit 3 comprises a second coil 4, shown with a magnetic core for concentrating the magnetic field force lines in order to improve the quality factor Q of the coil. The turns of this coil can be wound in a helical manner around the magnetic coil. As for the first coil, the plane or axis of the turns of the second coil is substantially parallel to the plane or axis of coupling coil 2. Preferably, this second coil 4 seen in the axial direction of coupling coil 2 is inside the closed turn or turns of the coupling coil.

With this configuration of the aforementioned coils, it is possible to transmit inductive signals S1 and S2 by magnetic coupling between the two circuits 1 and 3 in an optimum manner. The carrier frequency of said inductive signals is preferably of the order of 125 kHz, i.e. at a low frequency. It is thus clear that with the coupling coil positioned coaxially to the rotational axis of wheel 5, the distance separating transponder circuit 1 from interrogation circuit 3 is no longer of any importance. The close distance between each coil can thus remain constant even if the object is rotating about its rotational axis. Consequently, no amplitude modulation of the sensed inductive signals other than that necessary for the transmission of data between the two circuits appears in the signal receiver unit of circuits 1 and 3.

Since transponder circuit 1 is mounted on tyre 6 of wheel 5, it can include at least one sensor for measuring a physical parameter, such as the tyre pressure, temperature, tyre deformation, the rotational speed. The measurements carried out by the sensor are transmitted by amplitude modulation in inductive signals S2 to interrogation circuit 3. However, since the transponder of transponder circuit 1 is preferably a passive transponder without its own power source, interrogation circuit 3 must always transmit inductive signals S1 to transponder circuit 1. Thus, transponder circuit 1 can extract the energy necessary to operate from the received inductive signals.

For proper magnetic coupling between the coils, account must be taken of the distance between each of the coils, the orientation of the axis of the turns and the inductive signal reception surface of each coil. Since the dimension of the transponder circuit coil is small, the coupling coil has been chosen with a diameter of large dimension to ensure proper magnetic coupling. The number of turns of the first coil is preferably greater than the number of turns of the coupling coil, which can comprise only a single closed turn.

This coupling coil is located at the periphery of tyre 6 of wheel 5. The inductance value of the coupling coil depends upon the surface described by the closed turn or turns. Moreover, the mutual coupling inductance between the first coil and the coupling coil or the second coil and the coupling coil depends upon a coupling factor. This coupling factor takes account of the radius of each coil, the orientation of the turns of each coil and the distance separating each coil. Since the calculation of these different parameters is well known within the magnetic coupling field, only the essential elements to be taken into account to size each coil properly are mentioned.

Figure 3:
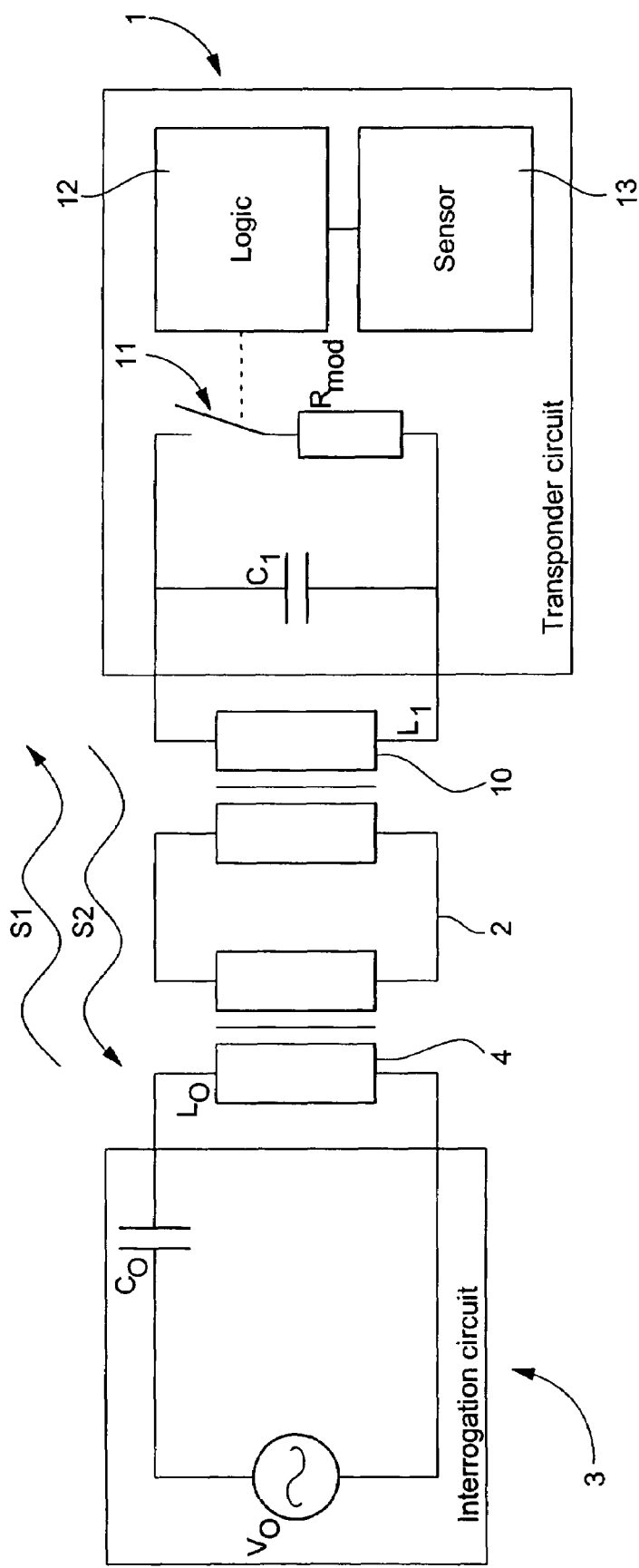
FIG. 3 shows schematically the various parts of the inductive signal transmission device according to the invention.

The various electronic components of the inductive signal transmission device are presented in a simplified manner in FIG. 3. It should be noted that the components of this Figure, which correspond to those of FIG. 2, bear identical reference numerals. In particular, it can be seen that coupling coil 2 acts as a magnetic coupling interface between first coil 10 and second coil 4.

Interrogation circuit 3 is shown schematically. It can powered electrically via the vehicle battery. It comprises an alternating signal generator, shown as an alternating voltage source $V_0$, connected to a capacitor $C_0$ in series with a coil 4 of inductance value $L_0$. Normally, the alternating signal generator comprises an oscillator and a data modulator, which are connected to an antenna drive device, not shown in FIG. 3. The oscillator generates signals at a determined frequency, for example 125 kHz, which corresponds to the carrier frequency of the inductive signals to be transmitted by second coil 4, whereas the modulator enables the oscillator to be connected or disconnected in order to add digital data to the oscillator signals.

The amplitude-modulated signals, which exit the drive device, represent a binary data sequence S1 to be transmitted to the transponder circuit. Each binary element of the sequence is defined over a determined period. One binary element of the binary sequence has a value of 1 when the signal amplitude is maximal, whereas one binary element of the binary sequence has a value of 0 when the signal amplitude is close to 0 in at least one time lag in a determined period of time of the binary element. This amplitude modulation by connecting or disconnecting the oscillator is called OOK modulation (On-Off-Keying). The data to be transmitted for example concerns the transponder circuit on command, the data transmission command, a specific time lag or parameters to be stored in said transponder circuit.

In interrogation circuit 3, there is also provided a demodulator, not shown, connected to second coil 4 in order to demodulate data transmitted in inductive signals S2 from transponder circuit 1. A microprocessor unit can receive the demodulated data by the demodulator for processing the data.

The circuit called P4095 manufactured by EM Microelectronic-Marin SA in Switzerland, can be used as interrogation circuit 3.

Transponder circuit 1 is also shown schematically. The elements of this circuit are only described summarily, since they form part of the general knowledge of those skilled in this technical field. The transponder circuit also comprises a resonant element formed by first coil 10 of inductive value L1, a capacitor C1 mounted in parallel, and a resistor Rmod in series with a switch 11, which are connected to first coil 10 and to capacitor C1. Resistor Rmod is connected in parallel to first coil 10 and to capacitor C1 when switch 11 is closed. Switch 11 is controlled by a logic part 12 of the transponder. By controlling the opening and closing of the switch it is possible to modulate the amplitude of inductive signals S2 for data transmission to the interrogation circuit.

The values of inductance L1 and capacitor C1 are chosen so as to generate maximum oscillation amplitude when the inductive signals are received. The resonant frequency is thus fixed as a function of the received inductive signal carrier frequency. When the inductive signals are received, transponder circuit 1 stores the received electrical energy in a specific capacitor, not shown, so as to supply electric power to all the components of the transponder circuit. Moreover, clock signals for clocking various operations carried out, particularly in logic part 12, are also extracted from the inductive signals sensed by coil 10. This logic part can comprise at least one memory for storing any type of data.

Transponder circuit 1 further comprises at least one sensor 13 for measuring a physical parameter. The sensor can be a pressure sensor for measuring the pressure of the tyre on which the transponder circuit is mounted, a temperature sensor, a sensor for measuring the tyre deformation or a speed or acceleration sensor. A combination of several sensors can also be envisaged. The sensor or sensors 13 and logic part 12 can be made in the same semi-conductor substrate, such as silicon.

When transponder circuit 1 is in the operating state, the measurements made by the sensor or sensors are stored and processed in logic part 12 in order to control the opening and closing of switch 11 for transmission of the data in inductive signals S2. The oscillation amplitude variation of the transponder circuit resonant unit can be detected by coil 4 of interrogation circuit 3 using the magnetic coupling made by coupling coil 2.

It should be noted that the data or binary sequence transmission is accomplished by the transponder circuit without interrupting the resonant unit oscillation. The carrier frequency of inductive signals S2 is thus substantially the same as the carrier frequency of inductive signals S1. Each binary element of the sequence is defined over a determined period. One binary element of the binary sequence has a value of 1 when the signal amplitude is maximal, whereas one binary element of the binary sequence has a value of 0 when the signal amplitude is reduced by a certain value by connecting resistive load Rmod in parallel in the resonant unit.

The circuit called P4150, manufactured by EM Microelectronic-Marin SA in Switzerland, can be used as transponder circuit 1. The transponder of this circuit is passive and operates at a low frequency, for example 125 kHz.

Figure 4:
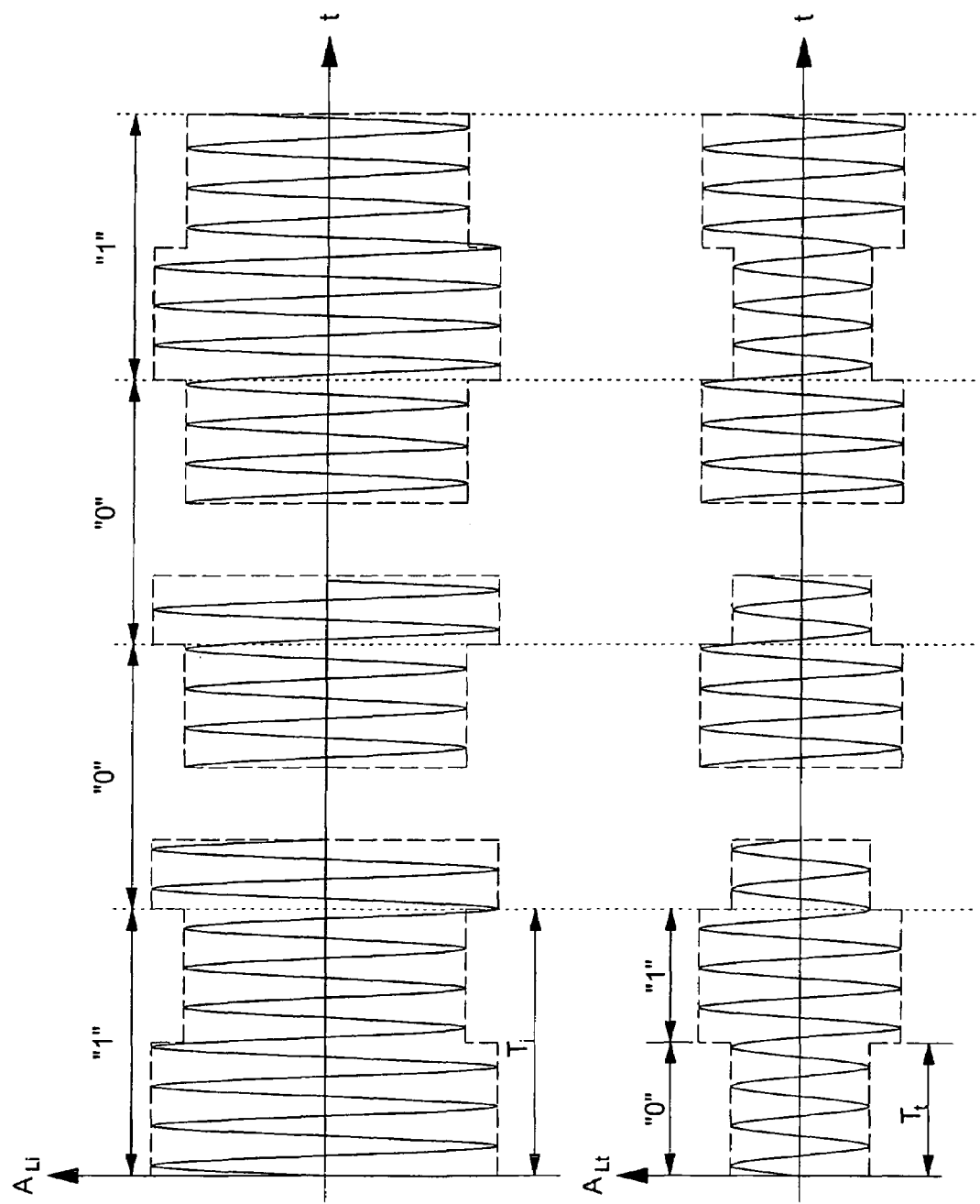
FIG. 4 shows graphs relating to data transmission by inductive signal amplitude modulation between the interrogation circuit and the transponder circuit of the inductive signal transmission device according to the invention.

In order to show the shape over time of the inductive signals transmitted between the interrogation circuit and the transponder circuit in a simplified manner, the top graph of FIG. 4 shows inductive signals transmitted by the interrogation circuit and the bottom graph shows inductive signals transmitted by the transponder circuit.

The top graph and the bottom graph show the amplitude variation $A_{Li}$ and $A_{Lt}$ of the inductive signals with a determined carrier frequency as a function of data to be transmitted. The data is transmitted in accordance with a conventional binary sequence obtained by amplitude modulation. In the top graph, one binary element of the binary sequence has a value of 1 over a determined period $T_i$ when the signal amplitude is maximal, whereas one binary element of the binary sequence has a value of 0 when the signal amplitude is close to 0 during at least one time lag in the determined period of one binary element. In the bottom graph, one binary element of the binary sequence has a value of 1 over a determined period $T_t$ when the signal amplitude is maximal, whereas one binary element of the binary sequence has a value of 0 when the signal amplitude is reduced by a certain value. The determined period $T_t$ is less than determined period $T_i$ so as to differentiate the transmitted data from the received data.

From the description that has just been given, multiple variants of the inductive signal transmission device can be conceived by those skilled in the art without departing from the scope of the invention defined by the claims. The device can be applied in any field in which an object is rotatably mounted with respect to a fixed structure. It can be mounted in part on a helicopter blade rotor, in a steam turbine, on a carousel, or on any other rotor machine. The magnetic coupling coil could have a polygonal shape while being positioned coaxially in relation to the rotational axis of a rotating object, such as a vehicle wheel. The interrogation circuit and the transponder circuit can each be fitted with an inductive signal transmission coil and reception coil. Frequency modulation can be used for transmitting data in the inductive signals instead of amplitude modulation. Moreover, the frequency of the transmitted inductive signals can be different in each circuit.

The invention claimed is:

1. A device for transmitting inductive signals, the device including a transponder circuit having at least one first coil, said transponder circuit being placed on an object, which is a vehicle wheel, capable of rotating about at least one rotational central axis passing through the object, and an interrogation circuit having at least one second coil, said interrogation circuit being placed on a structure to which the object is connected, said structure being a part of the body or chassis of said vehicle, wherein an annular coupling coil, provided with at least one closed loop turn, is mounted on a tire of the vehicle wheel coaxially to the rotational vehicle wheel axis of the vehicle wheel, said annular coupling coil acting as an inductive coupling interface between the first coil and the second coil in order to have a transmission of signals independent of the rotation of the vehicle wheel.

2. The device according to claim 1, wherein the dimension of the annular coupling coil is greater than the dimension of the first coil of the transponder circuit, and wherein the first coil seen in the axial direction from the annular coupling coil is inside the loop of the annular coupling coil.

3. The device according to claim 1, wherein the plane or axis of the turns of the first coil is arranged parallel to the plane or axis of the turns of the second coil, and to the plane and axis of the turn of the annular coupling coil.

4. The device according to claim 1, wherein the transponder of the transponder circuit is passive, and wherein the interrogation circuit transmits inductive signals at a determined resonance frequency such that the transponder circuit extracts the energy necessary to operate from the received inductive signals.

5. The device according to claim 4, wherein data is transmitted by the inductive signals by amplitude modulation from the interrogation circuit to the transponder circuit, and from the transponder circuit to the interrogation circuit, low frequency inductive signals transmitted between the two circuits having an identical carrier frequency.

6. The device according to claim 1, wherein the transponder circuit includes at least one sensor for measuring a physical parameter, and wherein the transponder circuit transmits inductive signals for data relating to the measurements carried out by said sensor.

7. The device according to claim 6, wherein the transponder circuit includes a pressure measurement sensor and/or a temperature measurement sensor.

8. The device according to claim 6, wherein the transponder circuit includes a logic part connected to at least one measurement sensor and to a resonant unit, which includes, mounted in parallel, the first coil, a capacitor and a resistive load in series with a switch, and wherein the logic part controls the switch so as to modulate the amplitude of the inductive signals to be transmitted as a function of the measurements carried out by the sensor or sensors.

9. A device for transmitting inductive signals, the device including a transponder circuit having at least one first coil, said transponder circuit being placed on an object capable of rotating about at least one rotational axis passing through the object, and an interrogation circuit having at least one second coil, said interrogation circuit being placed on a structure to which the object is connected, wherein a coupling coil, provided with at least one closed loop turn, is mounted on the structure or on the object coaxially to the rotational axis of the object, said coupling coil acting as an inductive coupling interface between the first coil and the second coil, wherein the transponder circuit includes at least one sensor for measuring a physical parameter, wherein the transponder circuit transmits inductive signals for data relating to the measurements carried out by said sensor, wherein the transponder circuit includes a logic part connected to at least one measurement sensor and to a resonant unit, which includes, mounted in parallel, the first coil, a capacitor and a resistive load in series with a switch, wherein the logic part controls the switch so as to modulate the amplitude of the inductive signals to be transmitted as a function of the measurements carried out by the sensor or sensors, and wherein the logic part and the sensor or sensors are made in the same semi-conductor substrate.

* * * * *